(12) United States Patent
do Amaral Assy et al.

(10) Patent No.: US 10,736,257 B2
(45) Date of Patent: Aug. 11, 2020

(54) DEVICE FOR SEED INOCULATION

(71) Applicant: Jose Roberto do Amaral Assy, Municipio de Caldas Novas, GO (BR)

(72) Inventors: Jose Roberto do Amaral Assy, Municipio de Caldas Novas (BR); Ricardo Araujo Pereira, Sao Paulo (BR); Silvio De Larcerda, Sao Paulo (BR)

(73) Assignee: Jose Roberto do Amaral Assy, Caldas Novas (BR)

( * ) Notice: Subject to any disclaimer, the term of this patent is extended or adjusted under 35 U.S.C. 154(b) by 155 days.

(21) Appl. No.: 15/933,206

(22) Filed: Mar. 22, 2018

(65) Prior Publication Data

US 2018/0206394 A1 Jul. 26, 2018

Related U.S. Application Data

(63) Continuation of application No. 15/354,717, filed on Nov. 17, 2016, now Pat. No. 9,943,026.

(30) Foreign Application Priority Data

Nov. 18, 2015 (BR) ...................... 10 2015 028993-6

(51) Int. Cl.
*A01C 1/08* (2006.01)
*A01C 7/12* (2006.01)
*A01C 7/08* (2006.01)

(52) U.S. Cl.
CPC ................ *A01C 1/08* (2013.01); *A01C 7/128* (2013.01); *A01C 7/08* (2013.01)

(58) Field of Classification Search
CPC .. A01C 1/08; A01C 1/00; A01C 7/128; A01C 7/127; A01C 7/12; A01C 7/08; A01C 7/00

See application file for complete search history.

(56) References Cited

U.S. PATENT DOCUMENTS

| 5,445,195 A * | 8/1995 | Kim | B01F 13/1058 141/100 |
| 5,954,704 A * | 9/1999 | Sherman | A61M 1/0001 128/200.24 |

(Continued)

FOREIGN PATENT DOCUMENTS

| BR | MU7601412 U | 7/1998 |
| BR | MU8800133 U | 8/2008 |

(Continued)

*Primary Examiner* — Christopher J. Novosad
(74) *Attorney, Agent, or Firm* — FisherBroyles, LLP

(57) ABSTRACT

A device for the inoculation of seeds is attached to a seed meter or a seed box on a planting machine. This is done to carry out the inoculation and treatment of seeds at the same time that they are being planted. The device has a reservoir where the inoculant is placed and then subsequently taken by the pump to a mixture chamber. At a top of the mixture chamber is a nozzle, which is located at an opposite side of where the seeds leave. They leave from the bottom of the device. There is a drive axle and a group of gears that move and give force to the blades that mix the seeds in the fluid located in the inner part of the chamber. The chamber is connected to the seed distributor disc and the flow of seeds is based on the seed distributor disc's consumption.

16 Claims, 8 Drawing Sheets

(56) References Cited

U.S. PATENT DOCUMENTS

| | | | | |
|---|---|---|---|---|
| 6,698,367 B1 * | 3/2004 | Decouzon | ............ | A01M 17/002 |
| | | | | 111/118 |
| 9,943,026 B2 * | 4/2018 | do Amaral Assy | ...... | A01C 1/08 |
| 2013/0255571 A1 * | 10/2013 | DuBois | .................. | B01F 7/001 |
| | | | | 118/423 |

FOREIGN PATENT DOCUMENTS

| | | | |
|---|---|---|---|
| BR | MU8701880 U2 | 1/2009 | |
| BR | MU8900413 U2 | 10/2010 | |
| CA | 2204423 A1 * | 11/1997 | ........... B60R 21/272 |
| JP | 63005327 A * | 1/1988 | ............ G02F 1/216 |

* cited by examiner

DEVICE FOR SEED INOCULATION

RELATED APPLICATIONS

This application is a continuation of U.S. patent application Ser. No. 15/354,717, filed Nov. 17, 2016, for "Device for Seed Inoculation," the entire disclosure of which is incorporated herein by reference, and which claims the benefit of the filing date of Brazilian Patent Application Serial No. BR 10 2015 028993-6, filed Nov. 18, 2015, for "Device for Seed Inoculation."

TECHNICAL FIELD

The present disclosure refers to a device for the inoculation or treatment of seeds that is attached inside of the seed meter or inside of the reservoir of the planting machine in such a way that they can be inoculated or treated with any product at the same time that they are being planted. This significantly reduces the waste of inoculants or other products. It ensures more efficiency in the treatment dosage used on the seeds, it avoids reduction of germination in the seeds and, as a consequence, it increases productivity in farming.

BACKGROUND

The treatment of seeds with insecticides and fungicides is widely used to control pests and diseases that attack the seeds. This process is normally done before the seeds are planted. It is normally done away from the seed meter or the reservoir of the seed planter, in a mechanical or manual way.

Now, the treatment process using inoculant in the seeds is carried out since the inoculated bacteria, in symbiosis with the plants, aid in capturing nitrogen from the atmosphere, which greatly saves on the use of fertilizers in farming.

With advances in agro-business and the constant greater need to increase productivity on farms, farming and the planting of seeds is not currently conducted without the previous treatment thereof.

In the case of inoculant comprising live bacteria, it is important that inoculation takes place a few hours before the seeds are planted. This time period can be varied depending on the type of inoculant that is used. When the seeds are not planted during this period, it will become necessary to re-inoculate them.

The inoculation can also be carried out simultaneously with the planting, directly on the crop furrows. When it is done in this way, there is likely to be major waste of the inoculant because it is not being applied just to the seeds. It is being applied to the furrows themselves in a continuous way.

Another factor to be considered is that many of the products used in the treatment of seeds are highly toxic, which have the ability to compromise the health of the people that are applying the product.

What follows are some prior art documents and their disadvantages.

The patent document BR MU7601412-6 shows a device used in the general treatment of grain flows that permits the use of, via liquid, insecticides, fungicides and wettable powder that can be sprayed on cereals and grains in reservoirs in which the grains enter due to gravity under an adjustable thick "curtain." The grains are jet sprayed from within in an outward direction as well as an inward direction. This takes place in a closed compartment without the inconveniences for the workers provided by traditional systems.

Another patent document is BRMU8701880-2, which describes the seed inoculation device that is used immediately before the seeds are sown by the planting machine. The function is to spray the seeds using an atomizer that reaches the seeds previously disposed in a blanket arrangement inside a chamber, where, due to the fact of being a homogeneous atomization, all of the seeds receive the inoculant liquid that is used to help the seeds' development and to obtain greater harvest yields.

The patent document BR MU8800133-4 illustrates an arrangement applied in a seed inoculator that can be mounted on top of the seeder box or can be supported from the ground, being connected to an electric pump in a mixer. This is then connected to a tractor or lorry that contains the inoculant or insecticide in the reservoir where is it unloaded on the seeds.

Another patent document is BR MU8900413-2, which describes a constructive device used in machines to inoculate seeds that may be mounted on the seeder box in one of the lines to prepare the seeds that will be scattered over the land. It has a container for the inoculant, an electric pump connected to the source of the agricultural machine, pressure controls and controls on the volume spray used on the seeds. It can be easily moved from one planting line to another from the planting machine.

All of the devices that have been described in this document thus far are not directly attached to the planter or the seed meter. Therefore, the requirement is for treatment done beforehand and for additional operations, which may compromise the microbiological life of the inoculant and its effectiveness until the seeds are planted.

The present disclosure describes, in some embodiments, a device for inoculation and treatment of seeds that can be assembled inside the seed meter or the seed reservoir on the planting machine in order to perform the inoculation or treatment of the seeds simultaneously to the planting. This ensures that the inoculation or treatment is done in an efficient way.

What follows is a summary and simplified description of the embodiments described in this disclosure. This summary is not a general extensive vision of all of the embodiments. The intention is not to identify fundamental or critical elements nor is it to outline the scope of all of the embodiments. The main and only aim is to present some concepts of the embodiments described in a simplified way as an introduction and then go into more detail further on in this description.

BRIEF SUMMARY

The present disclosure provides a device for the inoculation or treatment of seeds. It is mounted internally in the seed meter or the seed reservoir that is on the planting machine and permits the inoculation and treatment of the seeds in a simultaneous manner when planting is being done. This ensures a considerable reduction in the waste of inoculants or other treatments and guarantees that the whole process is more efficient.

The device works with a reservoir for receiving the inoculant or the treatment, hereinafter referred to as "fluid," which is then taken by a pump until it reaches a cylindrical chamber containing a mixture. The fluid is injected into the cylindrical chamber through an applicator nozzle and it is mixed with the seeds by a blade. The chamber has an outlet for the seeds that have been treated, which is directly connected to the seed distributor disc.

One advantage of the present disclosure, in some embodiments, is that it permits the mixture of fluids directly in the planting machines at the same time as the seeds are being planted.

Another advantage of the present disclosure, in some embodiments, is that it permits one to choose the type of adequate fluid (or treatment) for the seeds that are being planted.

One advantage of the present disclosure, in some embodiments, is that it allows for the determination of the sufficient fluid volume for the quantity of seeds that are being planted. This ensures that the treatment being used is not wasted.

A further advantage of the present disclosure, in some embodiments, is that it guarantees the effectiveness of the fluid while maintaining the product in accordance with the conservation standards, which can vary depending on the type of fluid that is used and the type of treatment.

Another advantage of the present disclosure, in some embodiments, is that it avoids reduction in the seed germination percentage.

Another advantage of the present disclosure, in some embodiments, is that it increases the productivity of the farming.

Another advantage of the present disclosure, in some embodiments, is that it allows the farmer to work in a more efficient way. This is because the farmer will no longer need to treat the seeds before planting them nor does this treatment need to be done externally from the planting machine, but only needs to fill the container with the desired treatment and start planting.

In order to achieve the above and related objectives of the disclosure, one or more embodiments comprise the features that will be described below and, in particular, defined in the claims. The following description and the accompanying drawings will show the specific aspects of the embodiments. These aspects, however, only serve to show some of the different ways in which the principles of the various embodiments can be used. Furthermore, it is intended that the described embodiments include all of these relevant aspects and their equivalent ones.

BRIEF DESCRIPTION OF THE DRAWINGS

The characteristics, nature and the advantages of the present disclosure will become more visible based on the detailed description below when it is read in conjunction with the drawings. These drawings are referenced with the same references for the same elements in which.

DETAILED DESCRIPTION

The present disclosure provides a DEVICE FOR THE INOCULATION OF SEEDS that is attached to the inside of the seed meter or the seed box (11) of a planting machine with the purpose of inoculating seeds simultaneously with planting.

Figure 1:
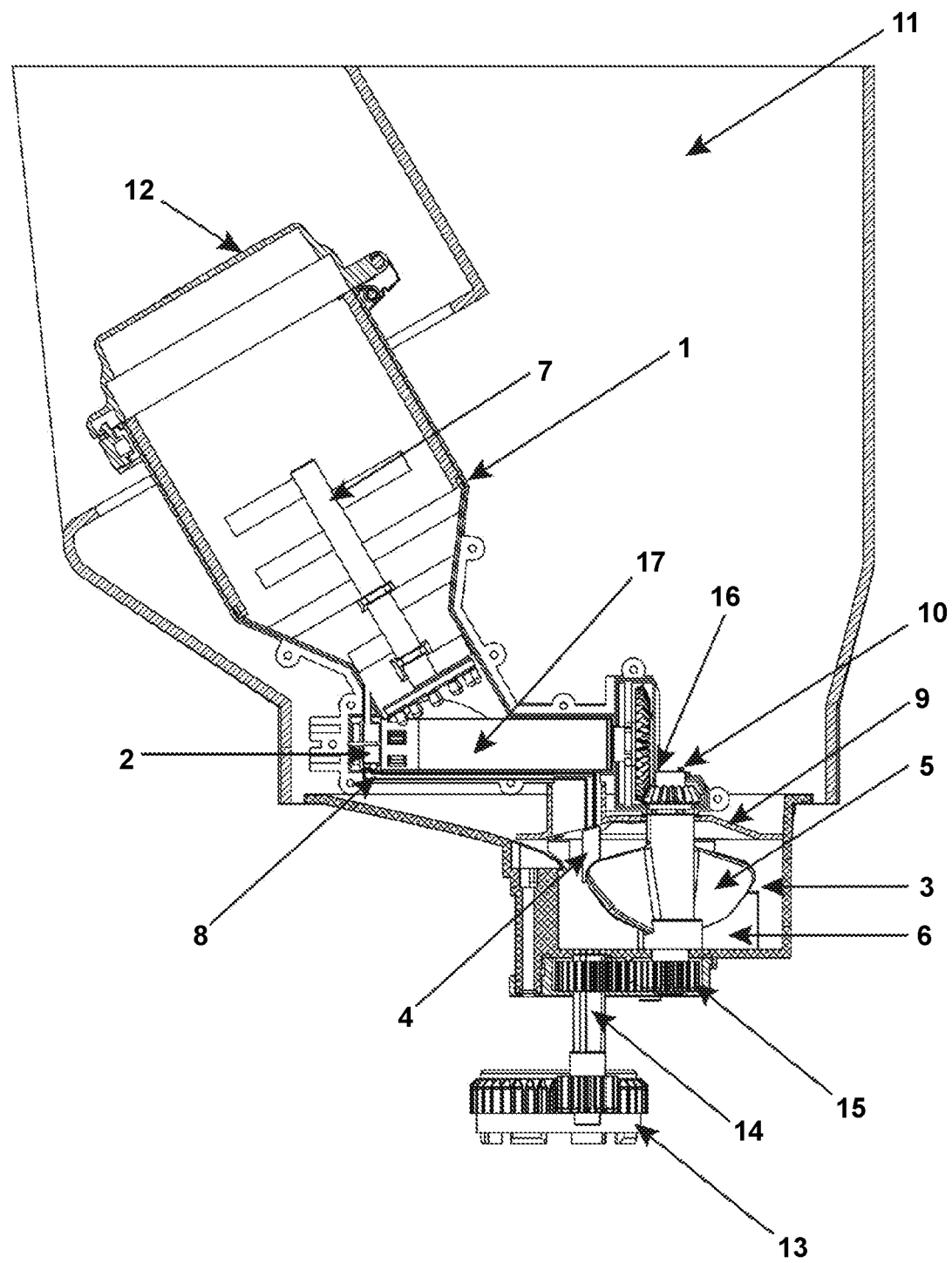
FIG. 1 is a cross-sectional view illustrating the device for inoculating seeds, which is an object of the disclosure. It is assembled in the inner part of the seed box of a planting machine.

Reference will now be made to FIG. 1 that illustrates the device for inoculating seeds, which has a reservoir (1) where the inoculant is placed, hereinafter referred to as "fluid." The fluid is subsequently taken by a pump (2) to a mixture cylindrical chamber (3). The cylindrical chamber (3) comprises a meter nozzle (4) on its top portion, located at the opposite side of the seed outlet (6) at the lower portion. It also has a drive shaft with a traction axis (17) and a group of gears (16) that moves the blades (5). The blades (5) mix the seeds with the fluid in the internal part of the chamber (3), which is connected to a seed distributor disc (18) (see FIG. 5), and this is attached to a gear (13). The seeds flowing through the seed distributor disc (18) occur due to the transmission ratio of the gears (13, 15) and a pinion (14), which functions in conjunction with the pump (2).

The reservoir (1) is a container that has a lid (12), inside of which there is a stirrer (7) that is used to keep the fluid particles in suspension. The reservoir (1) has the capacity to take on a sufficient volume of fluid for a day planting. It can be changed to provide treatments with different measurement requirements. This ensures that the reservoir only needs to be filled once per day.

Additionally, the reservoir (1) has two cover elements, a reflective material on its external surface and a material that has a low transmission of heat on its internal surface. For example, the external part is a plastic having been treated with reflective paint and the internal part has Styrofoam (polystyrene). The reservoir (1) has been built and constructed in such a way as to ensure the microbiological life of the fluid, conserving in a dry area that does not surpass 82.4° F. (28° C.) and without direct exposure to sunlight. This minimizes the fluid heating up and it keeps the internal temperature of the reservoir within the recommended standards. These conservation standards can vary depending on the different fluids to be used.

The pump (2) is, by preference, a peristaltic pump that is simple in its mechanics and that provides accuracy in the movement of the fluid. However, other types of pumps can be used such as spindle pumps, or diaphragm or plunger pumps, etc. As can be seen in FIGS. 8 and 9, the pump (2) has a group of rollers in a circular cradle that contains a hose (8) between the cradle and the rollers. One of the ends of the hoses (8) is immersed inside of the reservoir (1) and the other is attached to the meter nozzle (4) in the mixture chamber (3).

The rotation of the pump (2) is carried out by mechanical attachment with the seed distributor disc (18) or it can be driven independently through hydraulic or electrical engine, varying in a proportional way its metering based on the speed of the planter and the quantity of the seeds that are being planted. For seed flow to occur, some transmission ratios take place through the gears or the engine, and how the pump has been built allows for this to occur, making it possible to also change the pump flow through the use of valves or restrictions placed in the internal diameter of the hose. The pump (2) is a peristaltic pump by preference, but may also be other pumps such as screw pumps, centrifugal pumps, radial pumps, diaphragm pumps, plunger pumps, etc.

The relation between the pump rotation (2) and the necessary metering of the fluid was obtained through the calculations and confirmed through experimental study. After obtaining the ideal metering with reference to the number of planted seeds per unit length, the system keeps its rotation proportional to the rotation of the seed distributor disc (18) and the linear speed of the planter. Embodiments of the present disclosure can use an independent engine or an attachment with variable transmission ratios that will permit greater control over the metering by the varying of the rotation. This greater control is desirable because of the variations in the recommended metering amongst the different types and brands of fluids or treatments.

In the mixture chamber (3), the treatment or the inoculation process of the seeds takes place. The chamber (3) is separated from the seed box (11) by a weight and volume limiter (9) in such a way that it receives a partial volume of all the seeds to be planted. The blade (5) stirs the seeds and the fluid with sufficient frequency for the homogenization of the mixture and the feeding of the seed distributor disc (18).

The blade (5) that is inside the mixture chamber (3) is made out of a flexible material so that the seeds are not damaged by breakage. The blade further has a specific angle in its vanes in such a way as to favor the internal circular and vertical movement of the grains and fluid, ensuring a better mixture. The blade rotation (5) varies in a proportional way in relation to the seed distributor disc (18). It permits the continuous flow of seeds irrespective of the number of seeds per desired length. As mentioned earlier, a variable metering of the fluid can be obtained with independent traction or variable attachment of the pump.

Figure 2:
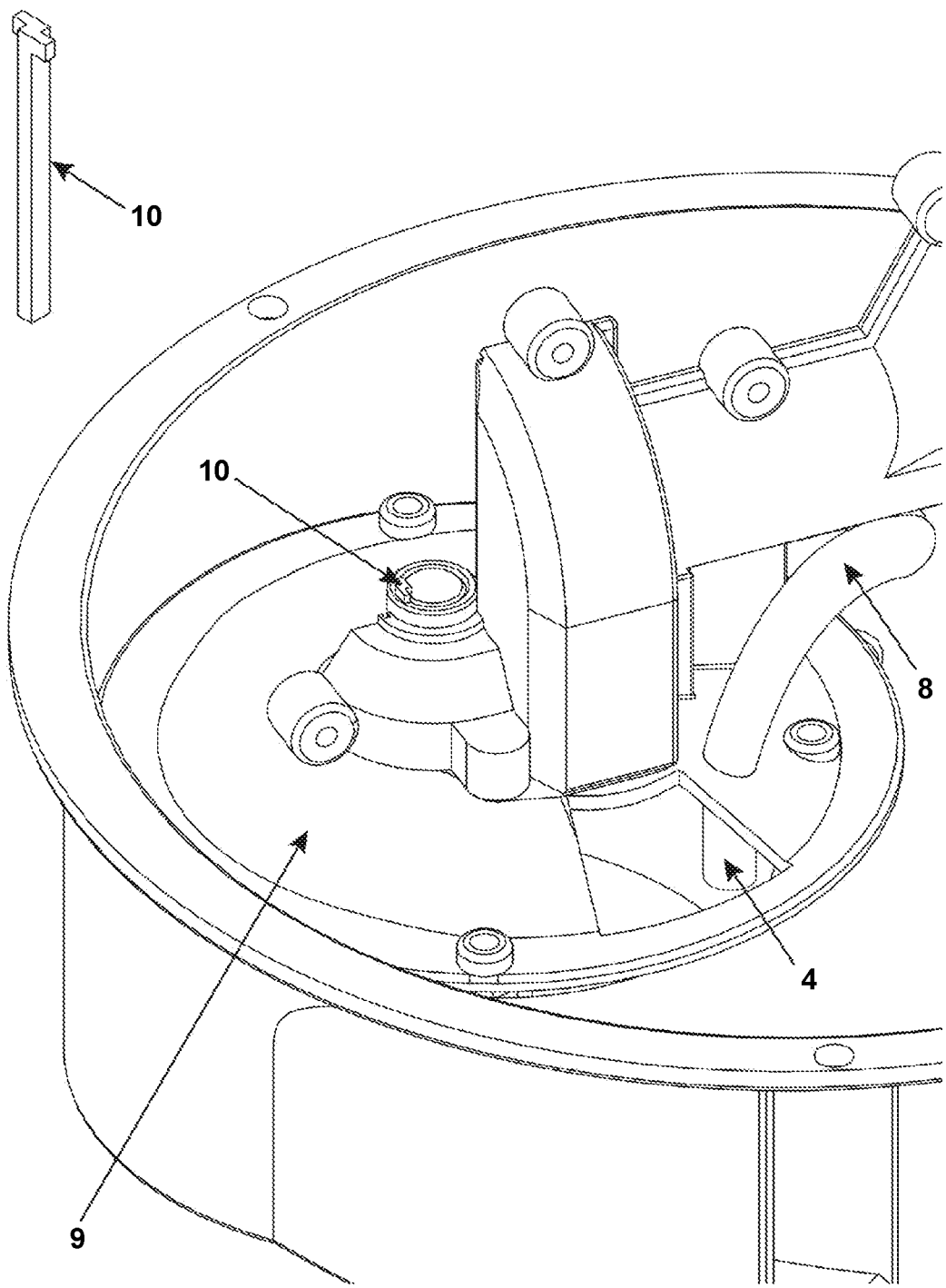
FIG. 2 is a partial view of the device for inoculating seeds illustrating where the mechanical fuse is housed.
Figure 3:
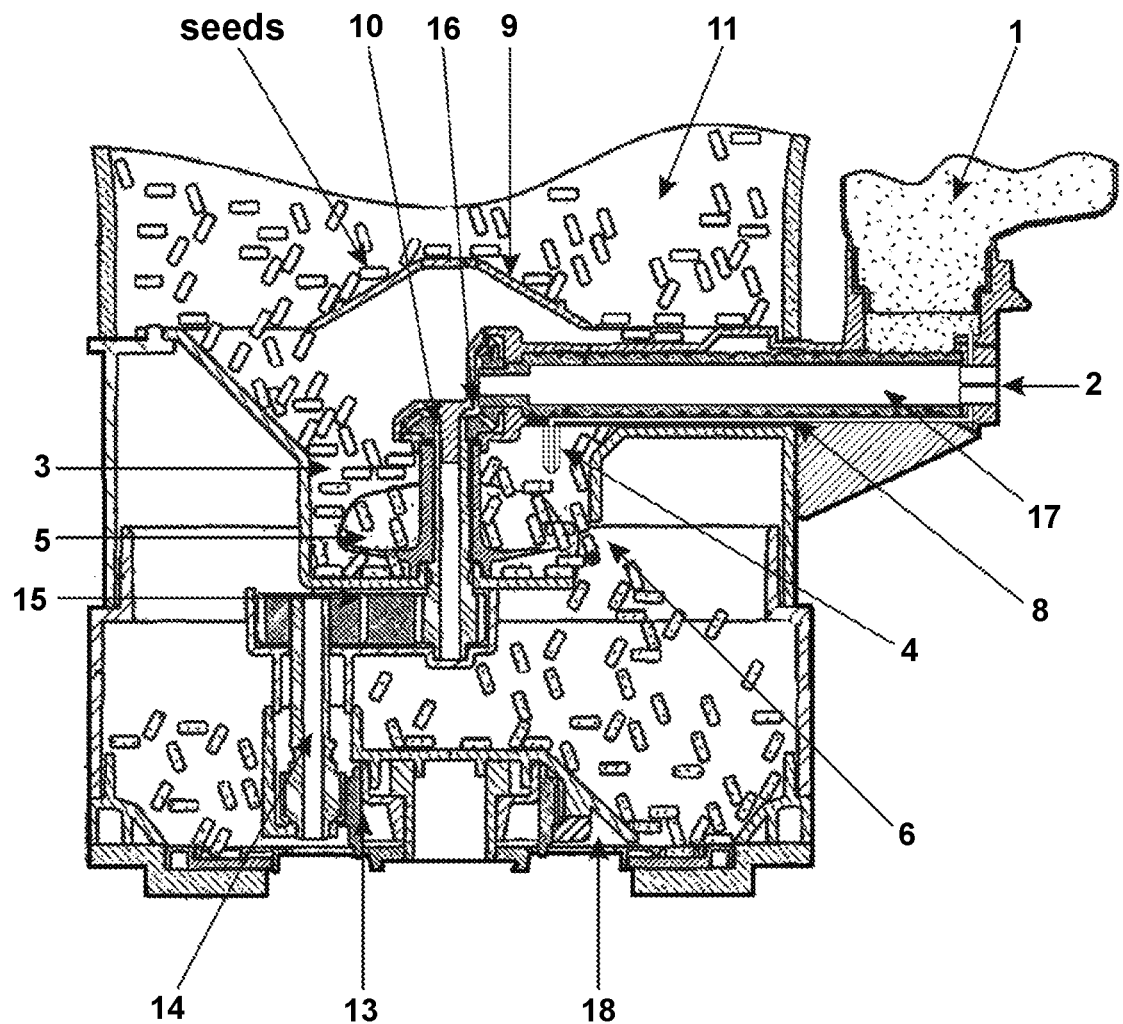
FIG. 3 is a partial cross-sectional view illustrating the processing of the seeds inside of the device for inoculating seeds.
Figure 4:
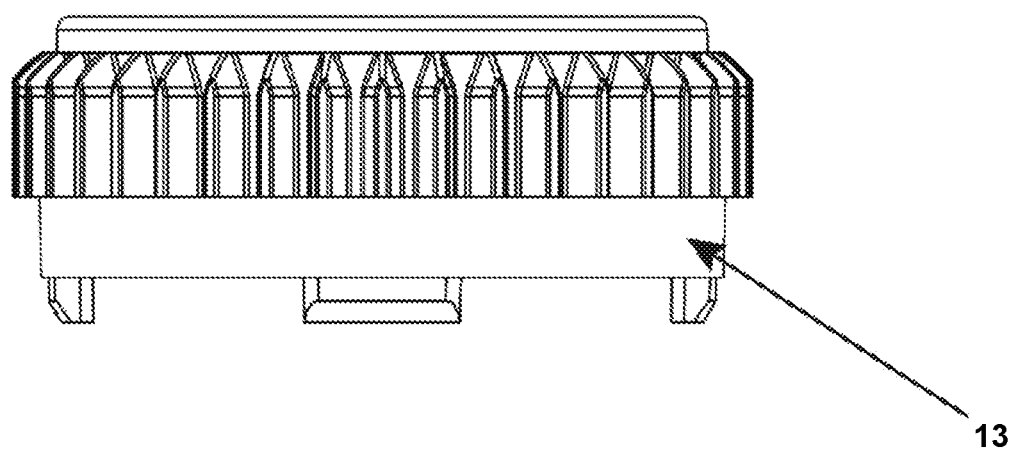
FIG. 4 is a side view of the gear of the device for inoculating seeds.
Figure 5:
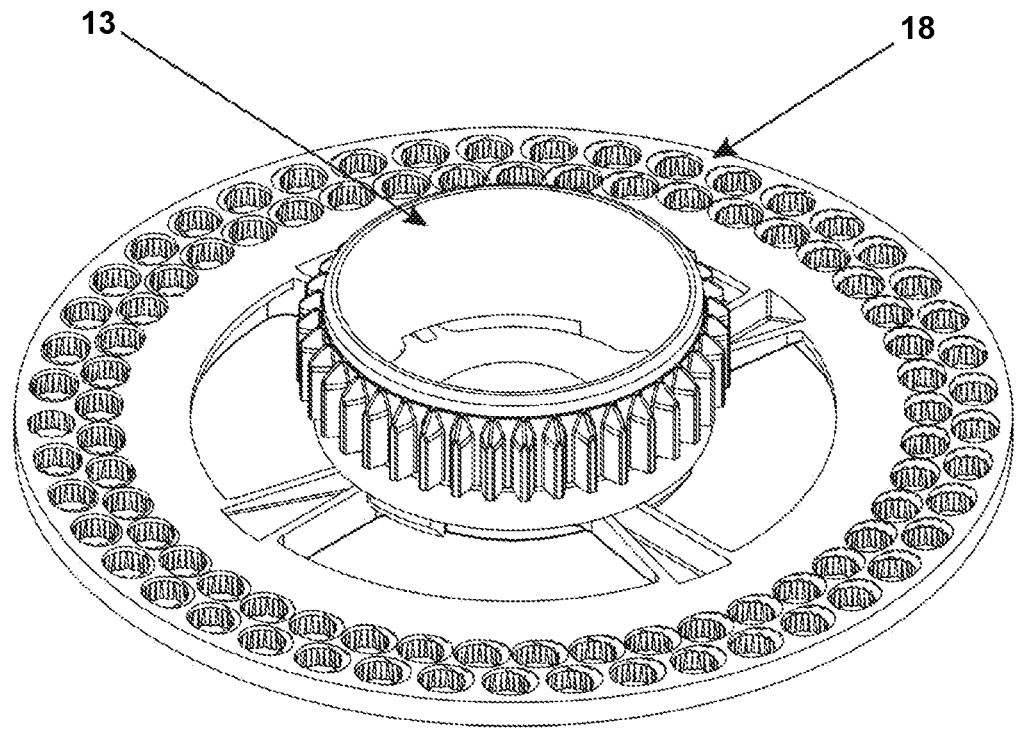
FIG. 5 is a perspective view of the gear shown in FIG. 4 attached to the seed distributor disc.
Figure 6:
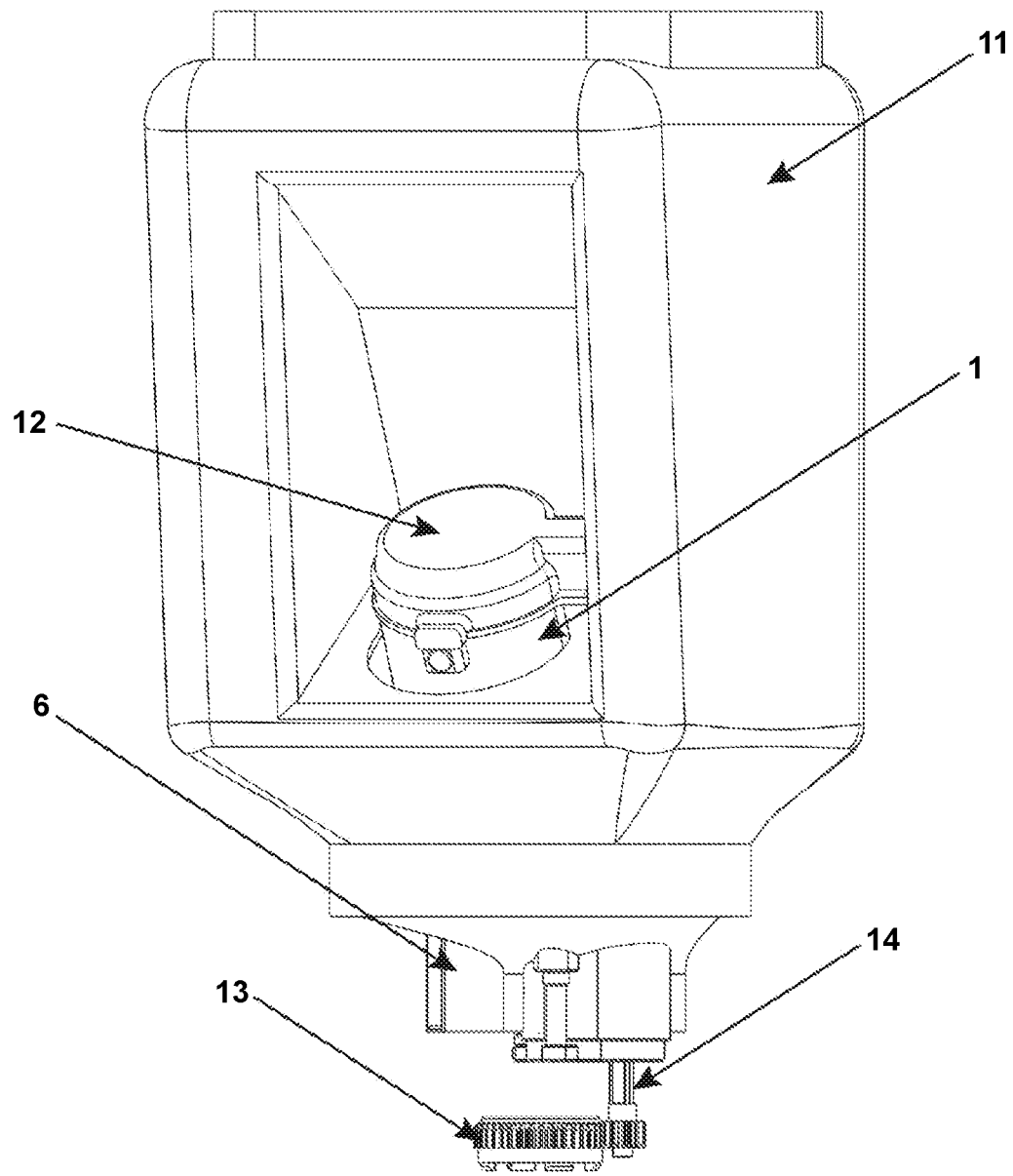
FIG. 6 is a perspective view illustrating the device for inoculating seeds attached to the planting machine.
Figure 7:
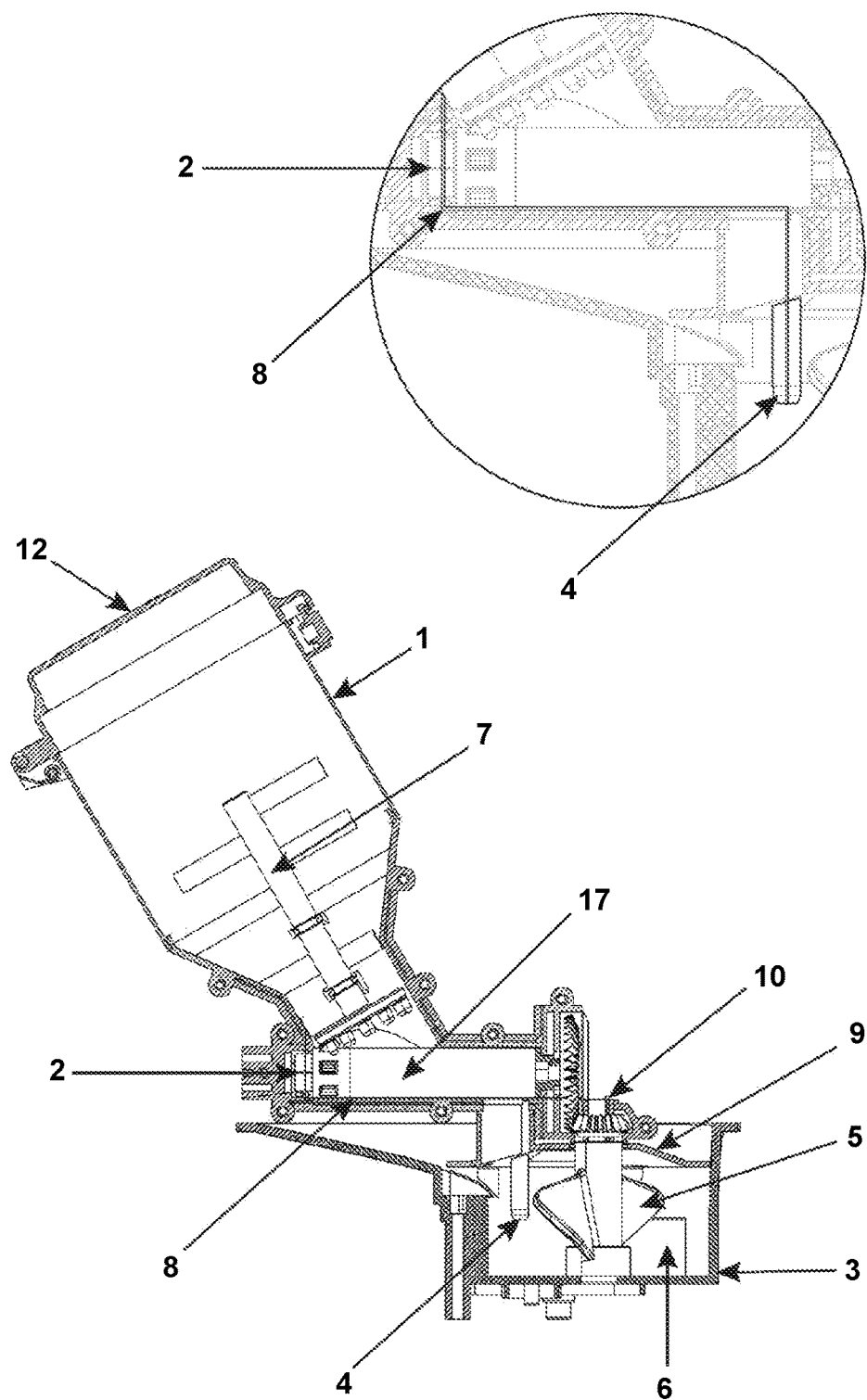
FIG. 7 is a cross-sectional view of the device for inoculating seeds with special emphasis on the inoculant meter nozzle.
Figure 8:
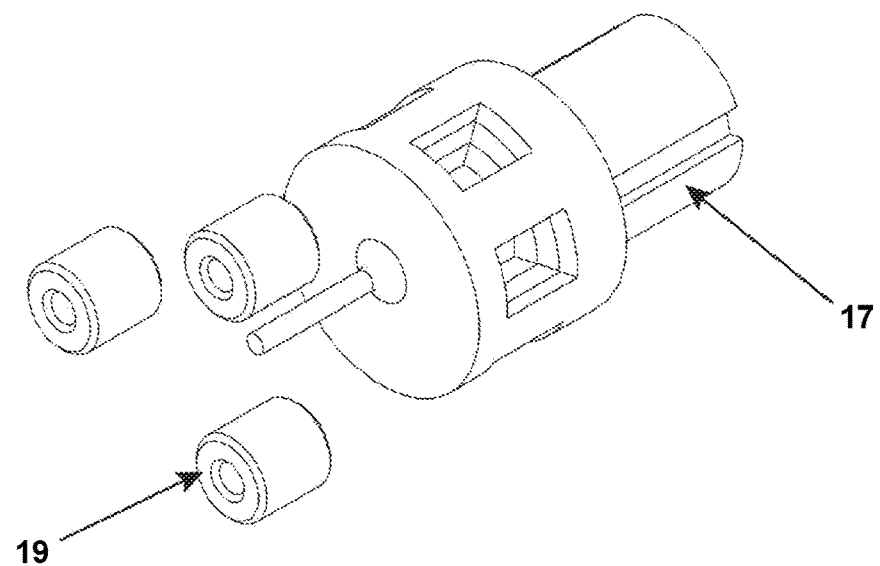
FIG. 8 is a perspective view illustrating a modality of a pump used to apply the inoculant.
Figure 9:
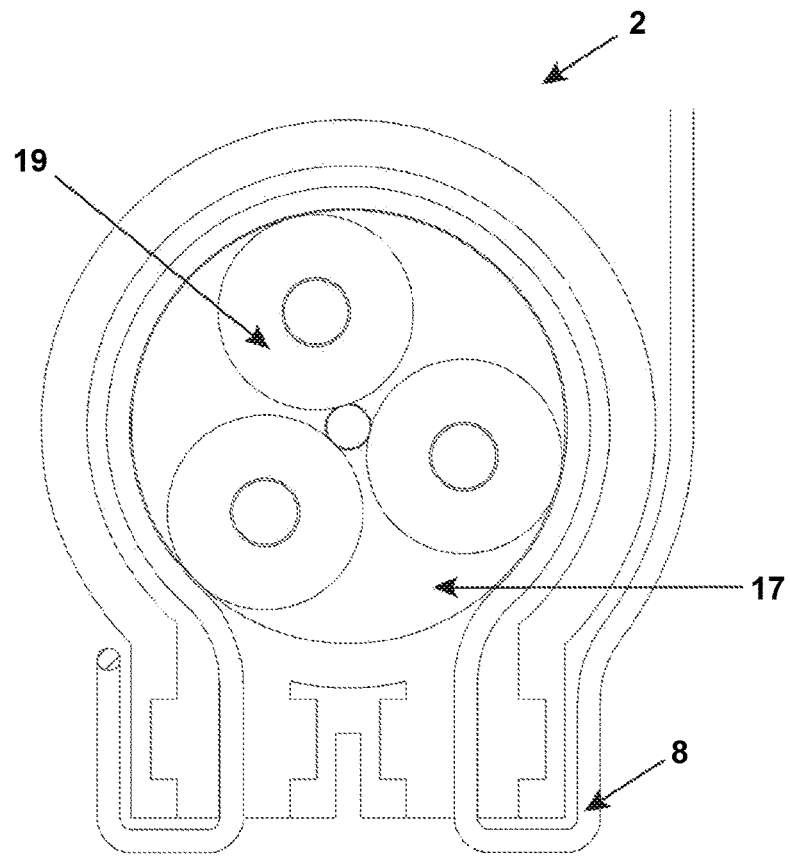
FIG. 9 is a cross-sectional view illustrating a modality of a pump used to apply the inoculant.
Figure 10:
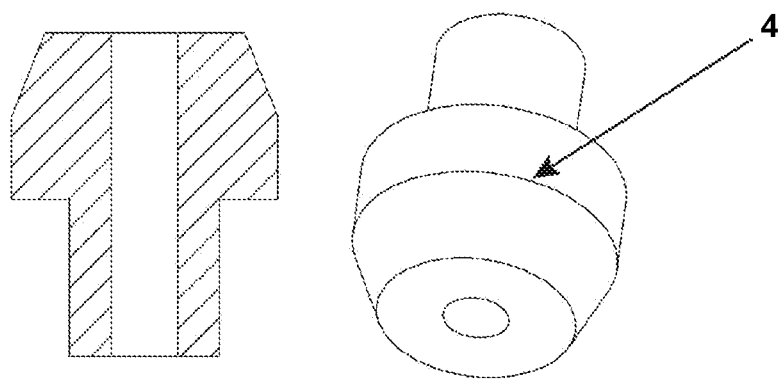
FIGS. 10 and 11 are perspective and cross-sectional views illustrating the meter nozzle for the device for inoculating the seeds.
Figure 11:
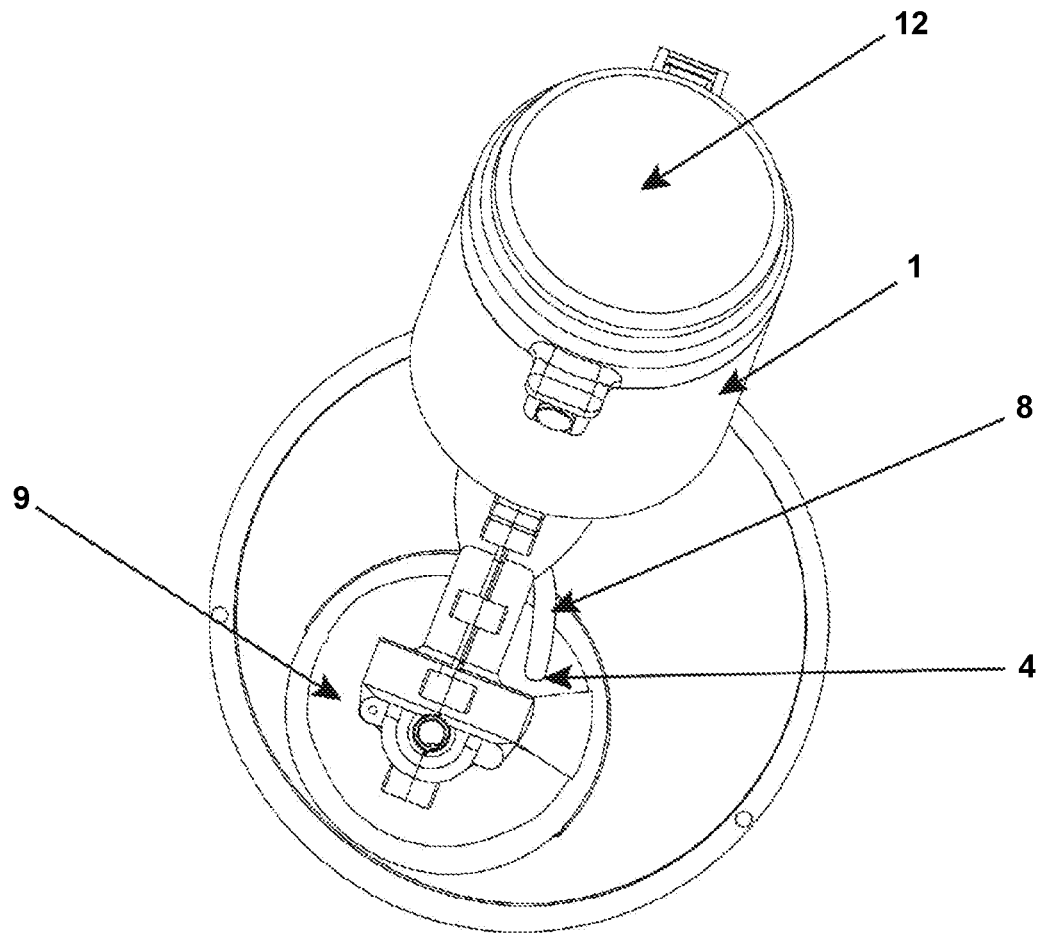

Reference will now be made to FIG. 2, illustrating a part of the device for the inoculation of seeds where a fuse (10) is housed, which is installed with the purpose of ensuring that the planting process is not hindered by some type of stoppage if a strange object such as a tool, stone, branch, etc., gets into the seed box (11) or enters the seed distributor disc (18). The fuse (10) can be one of following types: mechanical pin, clutch, electronic attachment, amongst others. It permits being quickly changed, acting to avoid damages occurring to the device, and is located at the entrance to the mixture chamber (3) extending into the inside of the chamber. At the moment when the fuse (10) is activated, it cuts into two parts, both having tabs for removal without the use of tools. The triggering of the fuse (10) occurs when the blade (5) has something that blocks its rotation, preventing mechanical damage to occur to it or other components of the device for the inoculation of the seeds. When the fuse (10) is triggered, the blade (5) and the pump (2) operations are stopped; however, the seeds continue passage to the seed distributor disc (18) without hindering the flow, obtained through an inclination at the back of the mixture chamber (3).

The meter nozzle (4), constructed in a simplified way, is a tube containing, at its far end, a hole that has a smaller dimension than the body itself, which functions as a dripping mechanism. Other types of nozzles can be used for different applications such as sprays, continuous flows, etc. In addition, it can be its own end of the duct (8) for the transportation of the fluid, which is considered to be its metering point. The nozzle (4) located in the mixture chamber (3) at the furthest point from the mixture chamber's outlet (6) is very important, enabling the seeds to spend more time mixing, which guarantees greater homogeneity and drying time.

It will be easy to understand for all those skilled in the art that modifications can be carried out to the disclosure without detracting from the essence and underlying concepts mentioned in the description. These modifications should be considered as being included within the scope of the disclosure. Consequently, the specific embodiments that have been described in detail above are merely illustrative and do not place limits on the scope of the disclosure. The scope of the disclosure must only be defined based on extension of the claims and any equivalent thereof.

What is claimed is:

1. A planting machine, comprising:
a device for inoculation of seeds attached to a seed meter or a seed box of the planting machine, the device comprising:
a fluid reservoir;
a pump with a hose having two ends, wherein one of the ends of the hose is positioned in the fluid reservoir and the other end of the hose is positioned to lead fluid from the fluid reservoir to seeds; and
a mixture chamber having movable blades, the movable blades being configured to mix the seeds with the fluid in the mixture chamber.

2. The planting machine of claim 1, wherein the device is driven by an engine comprising at least one of an electrical, pneumatic, or hydraulic engine, wherein the engine is configured to be mounted directly to the device or indirectly to the device through the use of straps, gears, or a flexible cable.

3. The planting machine of claim 1, wherein the pump comprises at least one of a peristaltic pump, a fuse pump, a centrifugal pump, a radial pump, a diaphragm pump, or a plunger pump.

4. The planting machine of claim 1, wherein the device comprises gears, a pinion, a drive shaft, and a seed distributor disc, wherein the end of the hose that is positioned to lead the fluid from the fluid reservoir to the seeds is attached to a meter nozzle, the meter nozzle being located at an upper side of the mixture chamber opposite from a seed outlet.

5. The planting machine of claim 4, wherein the drive shaft and the gears are configured to move the movable blades configured to mix the seeds with the fluid in the mixture chamber.

6. The planting machine of claim 4, wherein seed flow is based on the seed distributor disc consumption.

7. The planting machine of claim 4, wherein the device further comprises a weight and volume limiter arranged between the mixture chamber and the seed meter or seed box.

8. The planting machine of claim 4, wherein the meter nozzle comprises a spray nozzle, a continuous nozzle, or a dripper nozzle.

9. The planting machine of claim 1, wherein the device further comprises a fuse positioned at an entrance of the mixture chamber and extending into an interior thereof.

10. The planting machine of claim 9, wherein the fuse is configured to disconnect the device from a remaining part of the seed meter, wherein the fuse comprises at least one of a mechanical pin, a gear, or an electronic attachment.

11. The planting machine of claim 1, wherein the fluid reservoir comprises an internal stirrer and a lid.

12. The planting machine of claim 11, wherein the fluid reservoir and the lid are externally at least partially covered by a reflective material.

13. The planting machine of claim 11, wherein the fluid reservoir and the lid are internally at least partially covered by a polystyrene material.

14. The planting machine of claim 1, wherein at least a portion of the fluid reservoir, the pump, and the mixture chamber is configured for attachment to an outside of at least one of the seed meter or the seed box.

15. The planting machine of claim 1, further comprising a valve or a restriction of an internal diameter of the hose configured to alter a flow of fluid from the pump.

16. The planting machine of claim 1, wherein the pump comprises a group of rollers arranged in a circular cradle, and the hose is positioned between the cradle and the group of rollers.

* * * * *